March 31, 1942.   P. H. THOMPSON   2,277,999
RECIRCULATING CONTROL VALVE
Filed May 8, 1939    2 Sheets-Sheet 1
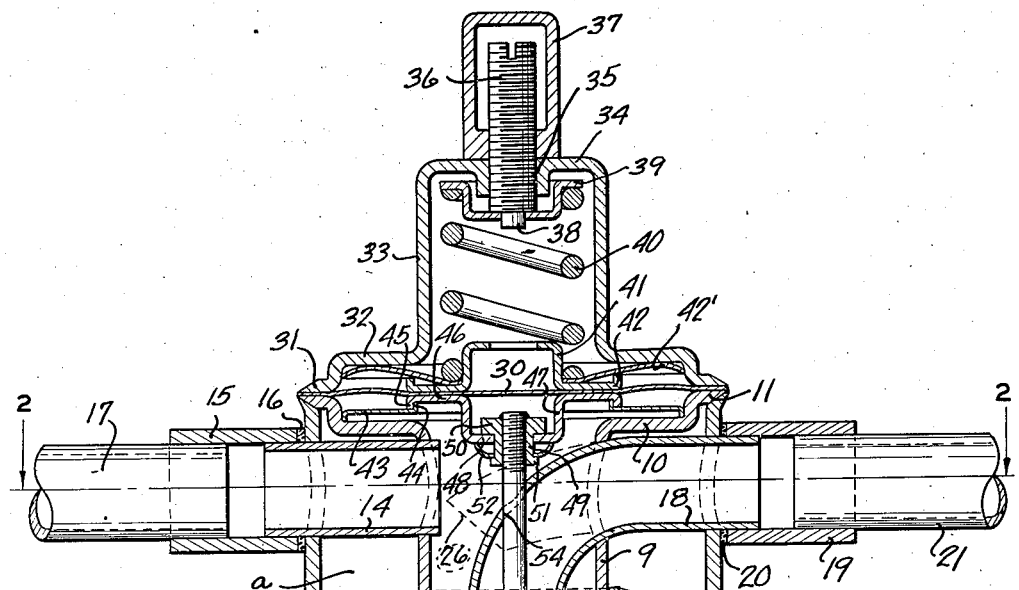
FIG. 1.
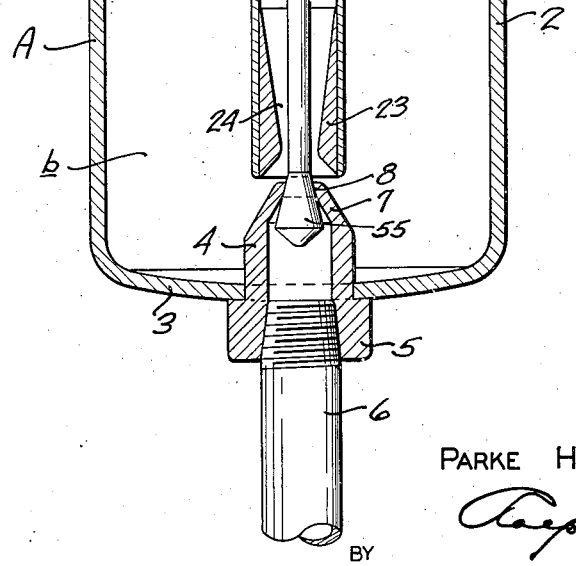
INVENTOR
PARKE H. THOMPSON
BY
ATTORNEY March 31, 1942. P. H. THOMPSON 2,277,999
RECIRCULATING CONTROL VALVE
Filed May 8, 1939  2 Sheets-Sheet 2
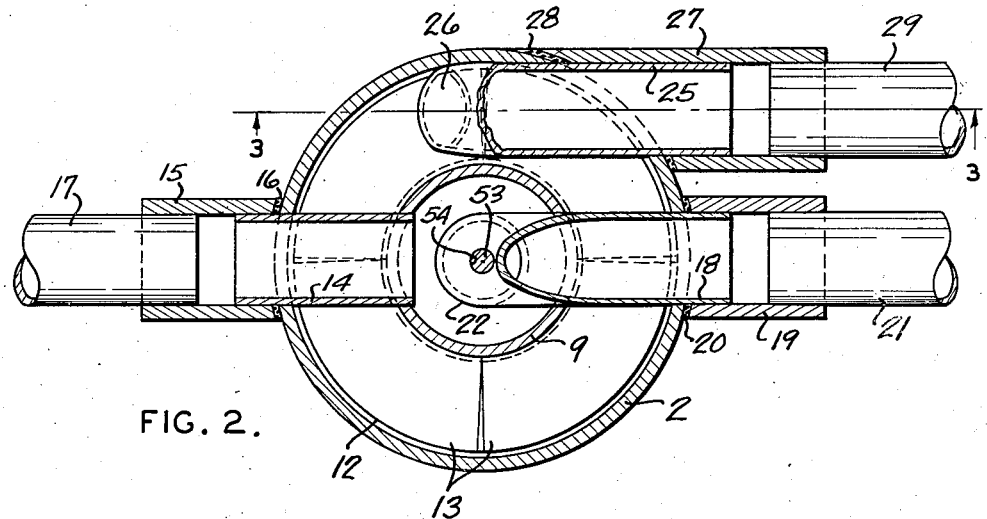
FIG. 2.
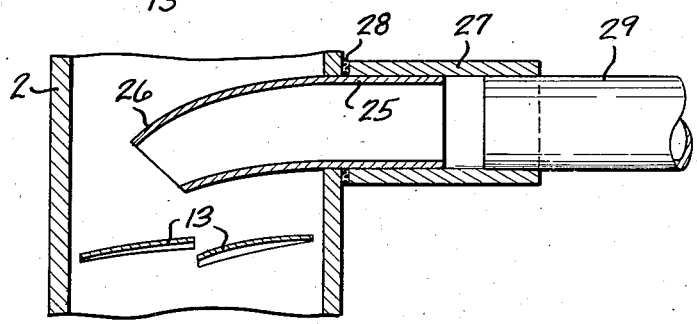
FIG. 3.
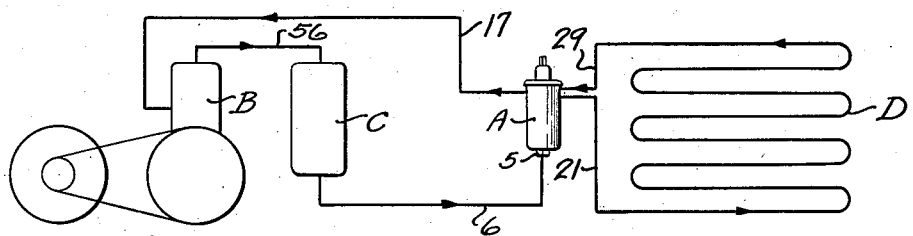
FIG. 4.
INVENTOR
PARKE H. THOMPSON
BY
ATTORNEY Patented Mar. 31, 1942

2,277,999

UNITED STATES PATENT OFFICE 2,277,999

RECIRCULATING CONTROL VALVE

Parke H. Thompson, Millville, N. J., assignor of thirty-five per cent to Russell Maguire, New York, N. Y.

Application May 8, 1939, Serial No. 272,373

10 Claims. (Cl. 62—127)

This invention relates generally to control valves and, more particularly, a certain new and useful improvement in control valves of pressure responsive type for use particularly, though not exclusively, in connection with refrigerating systems and is related in subject-matter to my co-pending applications Serial No. 272,374 and Serial No. 272,375, filed contemporaneously herewith, and applications Serial No. 280,720 and Serial No. 280,721, filed June 23, 1939.

My invention has for its primary object the provision of an efficient pressure responsive control valve adapted for regulating the supply of liquid preferably to a refrigerating system and, at the same time, abstracting any unused liquid from the returning or discharge flow for recirculation in the system.

My invention also has for an object the provision of a control valve of the type stated, which is extremely simple and economical in construction and operation, and which is capable of maintaining a substantially complete line of evaporation at the suction end of an evaporator.

My invention has for a further object the provision of a recirculating control valve which is extremely efficient both in controlling the supply of refrigerant to the evaporator and in recirculating the return liquid, and which employs a unique form of eductor in such manner as to utilize maximum jet energy.

My invention has for an additional object the provision of a control valve of the type stated which may be manufactured simply and quickly at relatively low cost, which is compact in structure, and which may be readily applied in a variety of different refrigeration systems without necessitating any material modification or rearrangement thereof.

And with the above and other objects in view, my invention resides in the novel features of form, construction, arrangement, and combination of parts presently described and pointed out in the claims.

In the accompanying drawings (2 sheets):

Figure 1 is a longitudinal sectional view of a pressure responsive recirculating valve constructed in accordance with and embodying my present invention;

Figure 2 is a transverse sectional view of the valve, taken approximately along the line 2—2, Figure 1;

Figure 3 is a detail sectional view of the valve, taken approximately along the line 3—3, Figure 2; and Figure 4 is a diagrammatic view of a refrigeration system incorporating a recirculating control valve of my present invention.

Referring now in more detail and by reference characters to the drawings, the preferred embodiment of my present invention there illustrated includes a cup-like body or shell A of suitable depth having a cylindrical side wall 2 and a slightly convexed bottom or end wall 3. Welded or otherwise fixed centrally in, and extending through, the bottom wall 3, is a nipple 4 provided with an outwardly presented internally threaded collar 5 for receiving the refrigerant supply line 6, the nipple 4 at its inner end being tapered, as shown, in the provision of a nozzle 7 having a seat or orifice 8.

Disposed co-axially within the upper portion of the shell A, is a cylindrical baffle 9 integrally provided at its upper margin, reference being made to Figure 1, with an annular outwardly extending partition or wall 10, which is, in turn, at its outer margin shaped to first extend upwardly and then outwardly again in the formation of an annular seating flange 11 for peripheral engagement with the upwardly presented margin of the shell wall 2.

Fixed upon the outer face, and adjacent the lower extremity, of the baffle 9, is an outwardly extending separator ring 12 having an outer circumferential dimension slightly less than the inner circumferential dimension of the shell wall 2 and being provided with a plurality of downwardly and outwardly bent deflector vanes 13 dividing the interior of the shell A into an upper or separating chamber $a$ and a lower or sump chamber $b$, all as best seen in Figure 1 and for purposes presently fully appearing.

Extending radially through the shell wall 2 and the baffle 9, is a short tube or conduit 14 provided on its outwardly presented end-portion with a tightly fitted connection sleeve 15 welded or otherwise fixed, as at 16, to the outer face of the shell wall 2 and sized for snugly accommodating a suction return line 17.

Also extending radially through the shell wall 2 and the baffle 9 preferably in diametral juxtaposition to the tube 14, is an outlet tube or conduit 18 likewise provided on its outwardly presented end-portion with a connection sleeve 19 welded or otherwise fixed, as at 20, to the outer face of the shell wall 2 and sized for accommodating the evaporator intake line 21.

Interiorly of the baffle 9, the outlet tube 18 is bent arcuately downwardly in the provision of a longitudinal leg or conduit 22 extending co-axially through the shell-chamber $b$ and terminating in a plane spaced a short distance upwardly from the plane of the inlet nozzle 8 and provided at its lower end with an annular insert 23 internally shaped to provide a Venturi-constriction 24.

Also mounted in and extending through the upper portion of the shell wall 2 substantially in the plane of the tubes 14, 18, and disposed in substantially tangential alignment with the inner face of the shell wall 2, is an inlet tube 25 provided at its inner end with a downwardly bent tip 26 and at its outer end with a connection sleeve 27 welded or otherwise fixed, as at 28, to the outer face of the shell wall 2 and sized for accommodating an evaporator outlet line 29, all as best seen in Figures 2 and 3 and for purposes presently fully appearing.

Marginally secured upon the upper face of, and extending across, the baffle flange 11, is a diaphragm 30, and mounted in marginal registration around the outer peripheral portion of the diaphragm 30, is a seating flange 31 of an end cap 32 corresponding in contour with, and being companion to, the baffle wall 10, the cap 32 being centrally, in opposition to the cylindrical baffle 9, provided with an upwardly presented cylindrical spring housing 33 having an end wall 34 centrally provided with a threaded aperture 35 for receiving an adjustment screw 36.

On its one or outer end, the screw 36 is provided with a conventional cap-nut 37 and on its other or inner end with a diametrally reduced co-axial swivel head 38 for retentively accommodating a flanged spring retainer 39 providing an abutment for the upper end of a compression spring 40, which, at its lower end, surrounds the upwardly deformed annular central portion 41 of a pressure plate 42 and abuttingly engages the upper face of a guide disk 42′ for positioning the pressure plate 42 concentrically upon the upper face of the diaphragm 30, all as best seen in Figure 1 and for purposes also presently fully appearing.

Loosely mounted upon the upwardly presented face of the baffle wall 10 and retained against lateral displacement by the ring portion of the seating flange 11, is a ring-shaped spring member 43 provided along its inner peripheral margin with an upturned annular rim or flange 44 hookwise engaged with an annular downturned flange or rim 45 of a pressure plate 46 having facewise abutment upon the under face of the diaphragm 30 in co-axial alignment with the pressure plate 42, the plate 46 also having a downwardly deformed annular central portion 47 provided with a centrally apertured end wall 48.

Shiftably mounted in the central aperture of the end wall 48, is an axially bored and internally threaded stem nut 49 having at its upper extremity a diametrally enlarged rim or flange portion 50 for retentive engagement with the upper face of said wall 48 and at its lower extremity a relatively smaller diametrally enlarged rim or collar 51 for retentive engagement with the inner peripheral margin of a centrally apertured spring washer 52 abuttingly engaged along its outer peripheral margin against the downwardly presented face of the end wall 48.

Threadedly mounted in, and preferably for securement welded or otherwise permanently fixed to, the stem nut 49, is a valve stem 53 extending axially downwardly through an aperture 54 in the bend or elbow of the outlet tube 18 and through the Venturi-constriction 24 and orifice 8 into the inlet nipple 4, the stem 53 being provided at its lower extremity with a conically shaped valve-forming enlargement 55 sized for valve-seating co-operation with the orifice 8, all as best seen in Figure 1 and for purposes shortly appearing.

In Figure 4, I illustrate an installation of refrigeration type employing or incorporating the present valve. In such installation, B is a standard compressor which is connected through a line 56 to the condenser-receiver C, in turn, connected through the supply line 6 to the intake nipple 5 of the valve-body A. The evaporator intake line 21 is conventionally connected to the intake side of the evaporator D, which is, in turn, connected at its outlet or return end to the evaporator outlet line 29. The return suction or exhaust line 17 connects the chamber b with the suction connection of the compressor B, completing the system, all substantially as shown.

In use and operation, the screw cap 37 of the valve is removed and the adjustment screw 36 shifted upwardly or downwardly, as the case may be, to increase or decrease the compressive action of the spring 40 in order to exert a predetermined yielding force through the pressure plate 42 upon the diaphragm 30 in accordance with the desired amount of back pressure under which the evaporator D must operate for the selected load conditions. Since, under initial or starting conditions, there will be no appreciable pressure within the body of the control, the compressive force of the spring 40 will displace the diaphragm 30 and the pressure plate 46 downwardly, thereby shifting the stem 53 downwardly and moving the valve member 55 out of closed or seated engagement within the orifice 8. The liquid refrigerant will thereupon be carried from the condenser-receiver C through the intake line 6 and expand through the orifice 8 and the Venturi-constriction 24 into the longitudinal leg 22 of the outlet tube 18 and flow through the intake line 21 into the evaporator D.

The refrigerant then traverses the evaporator, wherein partial evaporation takes place due to heat absorption, thereby changing some of the refrigerant into gaseous state. The mixture of gaseous and liquid refrigerant leaving the evaporator through the outlet line 29 re-enters the chamber a of the valve-body through the tangential tube 25 and, on being discharged, is given thereby a whirling movement, which causes the heavier particles of liquid to be thrown centrifugally outwardly against the inner peripheral face of the shell-wall 2. As the wet gas passes downwardly into the sump chamber b through the separator vanes 13, a final circulatory movement is imparted thereto, effecting removal of the remaining unevaporated liquid particles. The separated liquid particles drop from the vanes 13 and flow downwardly over the inner face of the shell-wall 2 into the sump chamber b. The practically dry saturated refrigerant gas reverses its direction after passage through the vanes 13 and flows upwardly interiorly of the baffle 9 and through the suction outlet tube 14 and the suction or exhaust line 17 to the suction connection of the compressor B for recompression.

The unevaporated liquid refrigerant which has collected in the bottom of the sump chamber b, however, is exposed to the suction or differential pressure effect set up in the Venturi-constriction 24 and is accordingly drawn upwardly into the Venturi-constriction 24 and then into the longitudinal leg 22 of the outlet tube 18 for recirculation through the evaporator D with the incoming refrigerant.

The pressure of gaseous refrigerant built up in the separator chamber a and the sump chamber b is exerted upon the under side of the diaphragm 30. When the pressure within the evaporator has become sufficient to counterbalance the compressive force of the spring 40, the diaphragm 30 will be urged upwardly, carrying with it the stem 53 for closing the orifice 8 for reducing the flow of supply and reinducted liquid refrigerant to the evaporator. Such reduced flow of refrigerant to the evaporator D results in a reduced load absorbing power and a consequent reduction in back pressure, restoring a governing condition in the valve.

It is, of course, possible under optimum conditions to achieve a desired back pressure in the evaporator D without any return of liquid refrigerant to the recirculating sump chamber b. In such event, there will be a slight reinduction of gaseous refrigerant, with the result that the velocity of refrigerant within the evaporator will be greatly increased, materially aiding in the maintenance of high evaporator efficiency.

Thus it will be seen that, by my present invention, I provide a simple, economically constructed, highly compact control valve, which is peculiarly well suited for application to a wide variety of refrigerating systems employing a wide range of different types of refrigerants. Not only is this type of recirculating valve control suitable for the control of liquid refrigerant, such as Freon and the like, but is also equally suited to the control of flow and regulation of evaporation in the steam jet refrigeration systems, high velocity steam evaporators, and the like.

It will also be evident that, by my present invention, I provide an exceedingly efficient recirculating valve, which makes available the maximum jet energy from full condensed pressure down to evaporator inlet pressure, since all such pressure drop occurs at one expansion point, so that the energy available will very closely approximate the theoretical energy value represented by the difference between isenthalpic expansion and adiabatic expansion.

It should be understood that changes and modifications in the form, construction, arrangement, and combination of the several parts of the valve may be made and substituted for those herein shown and described without departing from the nature and principle of my invention.

Having thus described my invention, what I claim and desire to secure by Letters Patent is:

1. A valve for controlling the flow of fluid to a device capable of discharging a return flow of the fluid comprising a chamber-providing body, first conduit-means for conducting fluid through the chamber, second conduit-means for discharging return fluid into the chamber, means in the chamber for removing any liquid components of the returning fluid, and means operably responsive to predetermined variations in the pressure conditions within the chamber for controlling the flow of fluid through the first conduit-means.

2. A control valve comprising a chamber-providing body, a tube having a straight leg extending axially through the chamber and being bent over at an end for extension through the chamber side wall for conducting fluid through said chamber, means operable responsive to predetermined variations in the pressure conditions within the chamber, and a valve stem extending axially through the tube leg and connected at an end to the pressure-responsive means for controlling the flow of fluid through the tube leg.

3. A valve for controlling the flow of fluid to a device capable of discharging a return flow of the fluid comprising an elongated cup-like shell providing a sump chamber having an intake port, an outlet port, a return port, and a suction port, conduit-means extending from the intake port to the outlet port, valve means operatively disposed in the chamber and associated with the conduit-means for controlling the flow of fluid through the conduit-means, and Venturi-means positioned in the conduit-means and having a suction opening communicating with the lower portion of the sump chamber.

4. A valve for controlling the flow of fluid to a device capable of discharging a return flow of the fluid comprising a body providing a chamber having an intake port, an outlet port, a return port, and a suction port, conduit-means extending from the intake port to the outlet port, valve means associated with the conduit-means for controlling the flow of fluid through the conduit-means, and pressure responsive means mounted in association with the said chamber and operably connected to the valve means for actuating the valve responsive to predetermined variations in the conditions of pressure within the chamber.

5. A valve comprising an elongated cup-like chamber-providing shell having an intake orifice in its bottom wall, a cylindrical baffle-forming member having an annular flange secured along its peripheral margin to the upper marginal edge of the shell and extending inwardly therefrom, a return conduit mounted in and extending through the shell side wall adjacent the baffle flange and terminating within the shell in substantially tangential juxtaposition to the side wall thereof, a suction tube mounted in the side wall of the shell and extending radially inwardly into, and terminating within the baffle, a conduit tube mounted in and extending through the side wall of the shell and into the baffle and downwardly in the formation of an elongated leg terminating in juxtaposition to the intake orifice, a diaphragm operatively mounted across the flange of the baffle in the formation of an end closure, an end cap operatively mounted across the outer face of the diaphragm, adjustable compression spring means operatively mounted on the end cap and abuttingly engaged at its one end against the diaphragm for biasing the diaphragm inwardly of the shell, and a valve stem operatively mounted against the inner face of the diaphragm and extending axially through the leg of the conduit tube and provided at its one end with valve-member adapted for seating engagement in the orifice.

6. A control valve for use in a refrigerating system including an evaporator having a supply line and a return line, and a compressor having a suction line, said valve comprising a cup-like shell having a cylindrical baffle member extending inwardly from one end of the shell and at its inner end spaced a substantial distance from the other end of the shell, conduit-means opening into the space between the shell and baffle for communication with the return line, conduit-means opening into the space within the baffle for communication with the suction line, a refrigerant supply line extending through the shell for connection to the evaporator; flow-controlling means in the portion of the supply line extending through the shell, and means disposed within the baffle for actuating the flow-controlling means responsive to variations in the pressure within the baffle.

7. A valve comprising an elongated open-topped cup, a partition-forming member marginally secured to the cup and extending transversely across the open top thereof, being provided with a downwardly opening baffle portion, a diaphragm secured to the partition-forming member and disposed across the baffle portion thereof, a cap marginally secured upon and extending across the diaphragm, inlet and outlet means connected through the cup, throttling means for controlling the flow of fluid between the inlet and outlet means, means for actuatingly connecting the throttling means to the diaphragm, and means in the cap for biasing the diaphragm.

8. A liquid recirculating valve for controlling the flow of a vaporizable liquid to a device which discharges a mixed gaseous and liquid return flow, said valve comprising a sump-forming cup having centrifugal separator means disposed in the upper end thereof, a return flow inlet connection opening into the centrifugal separator means so that the liquid component of the return flow will be separated therefrom and deposited within the cup, a supply conduit extending through the cup for conducting the supply flow to the device, throttling means within the conduit actuably responsive to the gaseous pressure within the cup, and Venturi means within the conduit having a suction connection opening to the lower portion of the cup for drawing the separated return liquid into the supply flow for recirculation therewith.

9. A control valve having a liquid receiving chamber, conduit means for conducting a flow of fresh liquid through the chamber, said conduit being provided with a Venturi-constriction and suction inlet for drawing liquid from the chamber into the conduit, a valve plug operably associated with the conduit means for throttling the flow of fresh liquid, and valve-stem means extending through the conduit for actuating the valve plug from the discharge side of the Venturi-constriction.

10. In a valve structure, a valve body providing a chamber, a liquid inlet, a liquid discharge outlet, valve means for controlling the flow from the inlet to the outlet, a second inlet for receiving a mixed stream of liquid and vapor, means located in the path of such stream for separating the stream into its vapor and liquid components, said means comprising a cylindrical baffle having a plurality of downwardly and outwardly deflected radial vanes, and a second outlet for discharging the vapor component of said stream from said chamber.

PARKE H. THOMPSON.